United States Patent
Park et al.

(10) Patent No.: US 7,872,595 B2
(45) Date of Patent: Jan. 18, 2011

(54) METHOD AND APPARATUS FOR INPUTTING AN ALPHABET CHARACTER IN A TERMINAL WITH A KEYPAD

(75) Inventors: Jung-Hoon Park, Suwon-si (KR);
Young-O Park, Suwon-si (KR);
Jung-Seung Lee, Yongin-si (KR);
Hyun-Soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/179,650

(22) Filed: Jul. 13, 2005

(65) Prior Publication Data

US 2006/0012494 A1    Jan. 19, 2006

(30) Foreign Application Priority Data

Jul. 13, 2004    (KR) .................... 10-2004-0054434

(51) Int. Cl.
*H03M 11/00* (2006.01)
(52) U.S. Cl. .................. 341/22; 345/168; 715/810; 379/433.06
(58) Field of Classification Search .............. 341/20, 341/22; 345/168; 382/230; 715/810; 379/433.06, 379/433.07
See application file for complete search history.

(56) References Cited

U.S. PATENT DOCUMENTS

| | | | | |
|---|---|---|---|---|
| 5,911,485 A | * | 6/1999 | Rossmann | 341/22 |
| 5,952,942 A | * | 9/1999 | Balakrishnan et al. | 341/20 |
| 6,204,848 B1 | * | 3/2001 | Nowlan et al. | 715/810 |
| 6,346,894 B1 | * | 2/2002 | Connolly et al. | 341/22 |
| 7,091,885 B2 | * | 8/2006 | Fux et al. | 341/22 |
| 2005/0270270 A1 | * | 12/2005 | Chadha | 345/157 |

FOREIGN PATENT DOCUMENTS

| | | |
|---|---|---|
| JP | 10-2000-0044287 A | 7/2000 |
| JP | 10-2003-0043532 A | 6/2003 |

* cited by examiner

*Primary Examiner*—Albert K Wong
(74) *Attorney, Agent, or Firm*—Roylance, Abrams, Berdo, and Goodman L.L.P.

(57) ABSTRACT

A terminal with a keypad enables a user to input an alphabet character through the keypad at high speed without modification of the keypad. The terminal comprises receiving a first input character in an alphabet input mode; waiting for a key input for at least one second input character succeeding the first input character; upon receiving a key input for the second input character, searching for a priority table in which a displaying order of a succeeding alphabet character is designated; and controlling a displaying order of the second input character according to the priority table.

10 Claims, 7 Drawing Sheets

FIG. 4A

| <a> | | |
|---|---|---|
| 1 | q:11 | z:22 |
| 2 | a:1 | b:89 | c:208 |
| 3 | d:205 | e:5 | f:35 |
| 4 | g:101 | h:15 | i:108 |
| 5 | j:5 | k:47 | l:508 |
| 6 | m:134 | n:774 | o:16 |
| 7 | p:125 | r:550 | s:312 |
| 8 | t:557 | u:51 | v:69 |
| 9 | w:44 | x:4 | y:90 |

| <b> | | |
|---|---|---|
| 1 | q:0 | z:0 |
| 2 | a:92 | b:3 | c:0 |
| 3 | d:0 | e:229 | f:0 |
| 4 | g:0 | h:0 | i:46 |
| 5 | j:11 | k:0 | l:80 |
| 6 | m:2 | n:0 | o:136 |
| 7 | p:0 | r:52 | s:18 |
| 8 | t:1 | u:115 | v:0 |
| 9 | w:0 | x:0 | y:76 |

| <c> | | |
|---|---|---|
| 1 | q:7 | z:0 |
| 2 | a:238 | b:0 | c:37 |
| 3 | d:1 | e:249 | f:0 |
| 4 | g:0 | h:235 | i:156 |
| 5 | j:0 | k:97 | l:66 |
| 6 | m:0 | n:17 | o:317 |
| 7 | p:0 | r:74 | s:20 |
| 8 | t:187 | u:79 | v:0 |
| 9 | w:0 | x:0 | y:40 |

| <d> | | |
|---|---|---|
| 1 | q:1 | z:0 |
| 2 | a:87 | b:10 | c:4 |
| 3 | d:10 | e:4 | f:29 |
| 4 | g:20 | h:4 | i:228 |
| 5 | j:0 | k:1 | l:13 |
| 6 | m:7 | n:7 | o:92 |
| 7 | p:0 | r:25 | s:36 |
| 8 | t:4 | u:47 | v:9 |
| 9 | w:31 | x:0 | y:22 |

| <e> | | |
|---|---|---|
| 1 | q:17 | z:2 |
| 2 | a:302 | b:31 | c:231 |
| 3 | d:31 | e:231 | f:513 |
| 4 | g:39 | h:5 | i:71 |
| 5 | j:2 | k:12 | l:260 |
| 6 | m:135 | n:551 | o:27 |
| 7 | p:66 | r:803 | s:507 |
| 8 | t:152 | u:15 | v:122 |
| 9 | w:66 | x:0 | y:60 |

| <f> | | |
|---|---|---|
| 1 | q:0 | z:0 |
| 2 | a:48 | b:2 | c:0 |
| 3 | d:2 | e:0 | f:0 |
| 4 | g:3 | h:0 | i:144 |
| 5 | j:1 | k:0 | l:17 |
| 6 | m:0 | n:0 | o:187 |
| 7 | p:0 | r:103 | s:1 |
| 8 | t:32 | u:35 | v:0 |
| 9 | w:1 | x:0 | y:4 |

| <g> | | |
|---|---|---|
| 1 | q:0 | z:0 |
| 2 | a:74 | b:0 | c:0 |
| 3 | d:0 | e:140 | f:0 |
| 4 | g:18 | h:68 | i:55 |
| 5 | j:0 | k:0 | l:28 |
| 6 | m:3 | n:13 | o:53 |
| 7 | p:0 | r:61 | s:14 |
| 8 | t:3 | u:41 | v:0 |
| 9 | w:0 | x:0 | y:10 |

| <h> | | |
|---|---|---|
| 1 | q:0 | z:0 |
| 2 | a:369 | b:11 | c:0 |
| 3 | d:0 | e:1079 | f:0 |
| 4 | g:0 | h:2 | i:289 |
| 5 | j:0 | k:1 | l:4 |
| 6 | m:3 | n:16 | o:200 |
| 7 | p:1 | r:37 | s:3 |
| 8 | t:39 | u:38 | v:0 |
| 9 | w:3 | x:0 | y:30 |

| <i> | | |
|---|---|---|
| 1 | q:2 | z:44 |
| 2 | a:143 | b:29 | c:308 |
| 3 | d:165 | e:250 | f:67 |
| 4 | g:85 | h:0 | i:2 |
| 5 | j:1 | k:31 | l:211 |
| 6 | m:102 | n:1016 | o:302 |
| 7 | p:37 | r:133 | s:529 |
| 8 | t:454 | u:50 | v:127 |
| 9 | w:0 | x:2 | y:0 |

| <j> | | |
|---|---|---|
| 1 | q:0 | z:0 |
| 2 | a:34 | b:0 | c:0 |
| 3 | d:0 | e:29 | f:0 |
| 4 | g:0 | h:0 | i:1 |
| 5 | j:0 | k:0 | l:0 |
| 6 | m:0 | n:0 | o:31 |
| 7 | p:0 | r:4 | s:0 |
| 8 | t:0 | u:42 | v:0 |
| 9 | w:0 | x:0 | y:0 |

| <k> | | |
|---|---|---|
| 1 | q:0 | z:0 |
| 2 | a:6 | b:1 | c:0 |
| 3 | d:0 | e:98 | f:4 |
| 4 | g:0 | h:6 | i:66 |
| 5 | j:0 | k:0 | l:22 |
| 6 | m:1 | n:13 | o:5 |
| 7 | p:0 | r:3 | s:43 |
| 8 | t:0 | u:1 | v:0 |
| 9 | w:1 | x:0 | y:5 |

| <l> | | |
|---|---|---|
| 1 | q:0 | z:0 |
| 2 | a:207 | b:5 | c:2 |
| 3 | d:108 | e:353 | f:19 |
| 4 | g:0 | h:1 | i:300 |
| 5 | j:0 | k:10 | l:306 |
| 6 | m:20 | n:0 | o:161 |
| 7 | p:19 | r:6 | s:74 |
| 8 | t:63 | u:46 | v:11 |
| 9 | w:3 | x:0 | y:140 |

FIG. 4B

| <p> | | |
|---|---|---|
| 1 | q:0 | z:0 |
| 2 | a:124 | b:0 | c:0 |
| 3 | d:2 | e:170 | f:6 |
| 4 | g:0 | h:60 | i:89 |
| 5 | j:0 | k:0 | l:101 |
| 6 | m:3 | n:1 | o:169 |
| 7 | p:70 | r:226 | s:16 |
| 8 | t:26 | u:53 | v:0 |
| 9 | w:0 | x:0 | y:8 |

| <t> | | |
|---|---|---|
| 1 | q:0 | z:0 |
| 2 | a:233 | b:0 | c:23 |
| 3 | d:0 | e:543 | f:2 |
| 4 | g:2 | h:1267 | i:478 |
| 5 | j:1 | k:0 | l:26 |
| 6 | m:9 | n:3 | o:476 |
| 7 | t:51 | u:124 | v:1 |
| 8 | p:0 | r:137 | s:142 |
| 9 | w:35 | x:0 | y:59 |

| <x> | | |
|---|---|---|
| 1 | q:0 | z:0 |
| 2 | a:5 | b:0 | c:5 |
| 3 | d:0 | e:7 | f:0 |
| 4 | g:0 | h:2 | i:8 |
| 5 | j:0 | k:0 | l:0 |
| 6 | m:0 | n:0 | o:0 |
| 7 | p:17 | r:0 | s:0 |
| 8 | t:21 | u:0 | v:0 |
| 9 | w:0 | x:0 | y:0 |

| <o> | | |
|---|---|---|
| 1 | q:1 | z:6 |
| 2 | a:40 | b:45 | c:70 |
| 3 | d:94 | e:24 | f:331 |
| 4 | g:26 | h:18 | i:33 |
| 5 | j:7 | k:53 | l:202 |
| 6 | m:221 | n:733 | o:137 |
| 7 | p:108 | r:521 | s:95 |
| 8 | t:149 | u:365 | v:92 |
| 9 | w:150 | x:4 | y:4 |

| <s> | | |
|---|---|---|
| 1 | q:1 | z:0 |
| 2 | a:101 | b:12 | c:82 |
| 3 | d:1 | e:327 | f:8 |
| 4 | g:0 | h:138 | i:214 |
| 5 | j:0 | k:17 | l:9 |
| 6 | m:51 | n:8 | o:192 |
| 7 | p:75 | r:2 | s:148 |
| 8 | t:472 | u:131 | v:1 |
| 9 | w:8 | x:0 | y:23 |

| <w> | | |
|---|---|---|
| 1 | q:0 | z:0 |
| 2 | a:253 | b:0 | c:0 |
| 3 | d:0 | e:160 | f:1 |
| 4 | g:0 | h:130 | i:177 |
| 5 | j:0 | k:2 | l:3 |
| 6 | m:0 | n:27 | o:127 |
| 7 | p:1 | r:15 | s:25 |
| 8 | t:2 | u:0 | v:0 |
| 9 | w:0 | x:0 | y:5 |

| <n> | | |
|---|---|---|
| 1 | q:1 | z:0 |
| 2 | a:159 | b:10 | c:149 |
| 3 | d:524 | e:320 | f:29 |
| 4 | g:374 | h:4 | i:147 |
| 5 | j:3 | k:38 | l:23 |
| 6 | m:14 | n:60 | o:184 |
| 7 | p:2 | r:8 | s:176 |
| 8 | t:393 | u:23 | v:22 |
| 9 | w:3 | x:0 | y:34 |

| <r> | | |
|---|---|---|
| 1 | q:0 | z:0 |
| 2 | a:307 | b:16 | c:45 |
| 3 | d:107 | e:701 | f:1 |
| 4 | g:45 | h:2 | i:398 |
| 5 | j:0 | k:41 | l:71 |
| 6 | m:65 | n:77 | o:311 |
| 7 | p:7 | r:79 | s:201 |
| 8 | t:147 | u:62 | v:22 |
| 9 | w:5 | x:0 | y:173 |

| <v> | | |
|---|---|---|
| 1 | q:0 | z:0 |
| 2 | a:45 | b:0 | c:1 |
| 3 | d:0 | e:313 | f:0 |
| 4 | g:0 | h:0 | i:165 |
| 5 | j:0 | k:0 | l:0 |
| 6 | m:1 | n:0 | o:24 |
| 7 | p:0 | r:0 | s:0 |
| 8 | t:0 | u:0 | v:0 |
| 9 | w:0 | x:0 | y:0 |

| <m> | | |
|---|---|---|
| 1 | q:0 | z:0 |
| 2 | a:271 | b:39 | c:4 |
| 3 | d:0 | e:278 | f:4 |
| 4 | g:1 | h:0 | i:153 |
| 5 | j:1 | k:0 | l:0 |
| 6 | m:50 | n:2 | o:155 |
| 7 | p:75 | r:2 | s:36 |
| 8 | t:2 | u:42 | v:0 |
| 9 | w:0 | x:0 | y:21 |

| <q> | | |
|---|---|---|
| 1 | q:0 | z:0 |
| 2 | a:1 | b:0 | c:0 |
| 3 | d:0 | e:0 | f:0 |
| 4 | g:0 | h:0 | i:1 |
| 5 | j:0 | k:0 | l:0 |
| 6 | m:0 | n:0 | o:0 |
| 7 | p:0 | r:0 | s:0 |
| 8 | t:0 | u:51 | v:0 |
| 9 | w:0 | x:0 | y:0 |

| <u> | | |
|---|---|---|
| 1 | q:0 | z:0 |
| 2 | a:42 | b:38 | c:56 |
| 3 | d:57 | e:90 | f:3 |
| 4 | g:49 | h:2 | i:43 |
| 5 | j:0 | k:2 | l:111 |
| 6 | m:97 | n:163 | o:1 |
| 7 | p:42 | r:300 | s:191 |
| 8 | t:200 | u:0 | v:0 |
| 9 | w:0 | x:0 | y:4 |

| | <y> | | |
|---|---|---|---|
| 1 | q:0 | z:1 | |
| 2 | a:12 | b:1 | c:3 |
| 3 | d:1 | e:42 | f:0 |
| 4 | g:0 | h:2 | i:8 |
| 5 | j:1 | k:0 | l:7 |
| 6 | m:8 | n:6 | o:58 |
| 7 | p:5 | r:6 | s:62 |
| 8 | t:3 | u:0 | v:0 |
| 9 | w:3 | x:0 | y:0 |

| | <z> | | |
|---|---|---|---|
| 1 | q:0 | z:3 | |
| 2 | a:10 | b:0 | c:0 |
| 3 | d:0 | e:35 | f:0 |
| 4 | g:0 | h:0 | i:15 |
| 5 | j:0 | k:0 | l:0 |
| 6 | m:0 | n:0 | o:12 |
| 7 | p:0 | r:0 | s:0 |
| 8 | t:0 | u:0 | v:0 |
| 9 | w:0 | x:0 | y:1 |

FIG.4C

METHOD AND APPARATUS FOR INPUTTING AN ALPHABET CHARACTER IN A TERMINAL WITH A KEYPAD

PRIORITY

This application claims the benefit under 35 U.S.C. §119 (a) to an application entitled "Method and Apparatus for Inputting Alphabet Character in a Terminal with a Keypad" filed in the Korean Intellectual Property Office on Jul. 13, 2004 and assigned Ser. No. 2004-54434, the entire contents of which are incorporated herein by reference.

BACKGROUND OF THE INVENTION

1. Field of the Invention

The present invention relates generally to a key input method and apparatus in a terminal with a keypad. In particular, the present invention relates to a method and apparatus for inputting alphabet characters.

2. Description of the Related Art

In general, a mobile terminal refers to a device designed such that an individual can carry it and transmit/receive voice and data regardless of time and place. The mobile terminal is classified into a work analysis program (WAP) phone, a personal digital assistance (PDA), a web pad, and the like and is commonly used by an increasing number of people due to its ability to provide personal service-based mobility. With the development of communication technology, the mobile terminal is used not only for voice communication but also image communication. Due to the rapid progress of mobile communication technology, service providers or mobile carriers provide users with additional services in addition to the basic mobile terminal's functions of processing calls and guaranteeing the quality of the calls. For example, the additional services include a voice information service for providing users with news, sports, stock, and weather information, a traffic information service for providing users with traffic information, and a communication service such as Internet access, fax and e-mail services. In addition to the foregoing services, an increasing number of mobile terminal users are enjoying text and voice services.

In most cases, to enjoy such services, a user of the mobile terminal inputs characters using a keypad mounted on the mobile terminal. For example, to transmit a short message service (SMS) message, store phone numbers in a phone book, and transmit an e-mail via wireless Internet using the mobile terminal, the user inputs corresponding characters using the keypad. A description will now be made regarding how the user inputs alphabet characters through the existing keypad used for the mobile terminal.

FIG. 1 is a diagram illustrating a layout of a conventional keypad for a mobile terminal. As illustrated in FIG. 1, the keypad includes buttons arranged in 4 rows and 3 columns, and numbers, alphabet characters and special characters are mapped to the buttons. In one of a number mode, an alphabet character mode, and a special character mode, if the buttons are pressed, numbers or characters mapped to the pressed buttons are input. Referring to FIG. 1, in each button, a number is written in the center, and possible alphabet characters of, for example, QZ, ABC, GHI, . . . , WXY, are written under the number. As illustrated, 3 alphabet characters are allocated to most of the buttons with a number written thereon. To input a word using the keypad of FIG. 1, the user should press buttons corresponding to alphabets comprising the word a predetermined number of times as shown in Table 1.

TABLE 1

| No. of button presses | 1 | 2 | 3 | 4 | 5 | 6 | 7 | 8 | 9 |
|---|---|---|---|---|---|---|---|---|---|
| 1 | Q | A | D | G | J | M | P | T | W |
| 2 | Z | B | E | H | K | N | R | U | X |
| 3 |   | C | F | I | L | O | S | V | Y |

It will be assumed herein that the user inputs a word "LOVE" through the conventional keypad of FIG. 1. Referring to Table 1, the user should press a button with a number '5' three times to input 'L', a button with a number '6' three times to input 'O', a button with a number '8' three times to input 'V', and a button with a number '3' two times to input 'E'.

The conventional keypad does not fully consider the convenience of the user and requires the user to press the same button several times in order to input a word. Therefore, the user feels inconvenienced especially when inputting frequently used words. For this reason, English-speaking users feel inconvenienced by the alphabet character input method because their body structure does not match well with the structure of the conventional keypad. To solve this problem, the alphabets of the conventional keypad should be appropriately rearranged. However, it is difficult to change a structure and design of products that have already been put on the market. In addition, because English-speaking users have become accustomed to the structure of the conventional keypad, it is not preferable to change the structure of the keypad. If a device for displaying all of the words starting with characters input by the user based on words in an English dictionary in the mobile terminal to solve the problems, the required memory capacity increases and the power required for outputting a specific word also increases, placing restrictions on the implementation.

SUMMARY OF THE INVENTION

It is, therefore, an object of the present invention to provide a method and apparatus for inputting alphabet characters with a reduced number of button presses in a terminal.

According to one aspect of the present invention, there is provided a method for inputting an alphabet character in a terminal with a keypad. The method comprises the steps of receiving a first input character in an alphabet input mode; waiting for a key input for at least one second input character succeeding the first input character; upon receiving a key input for the second input character, searching for a priority table in which a displaying order of a succeeding alphabet character is designated; and controlling a displaying order of the second input character according to the priority table.

According to another aspect of the present invention, there is provided an apparatus for inputting an alphabet character in a terminal with a keypad. The apparatus comprises a memory for storing various characters input through the keypad, and storing a predetermined priority table in which a displaying order of at least one alphabet character succeeding a first input alphabet character is designated; a display for visually displaying the alphabet character; and a controller for searching for the priority table corresponding to a just previously input alphabet character if there is any key input for the succeeding alphabet character, and outputting the succeeding alphabet character to the display according to the priority table.

BRIEF DESCRIPTION OF THE DRAWINGS

The above and other objects, features and advantages of the present invention will become more apparent from the following detailed description when taken in conjunction with the accompanying drawings in which:

FIGS. 4A to 4C are diagrams illustrating frequencies of words calculated according to an embodiment of the present invention.

Throughout the drawings, the same or similar elements, features and structures are represented by the same reference numerals.

DETAILED DESCRIPTION OF EXEMPLARY EMBODIMENTS

Several embodiments of the present invention will now be described in detail with reference to the accompanying drawings. In the following description, a detailed description of known functions and configurations incorporated herein has been omitted for conciseness.

Although the method and apparatus for inputting alphabet characters according to an embodiment of the present invention can be applied to every device with a keypad, it will be assumed herein as an example that the method and apparatus is applied to a mobile terminal with a keypad.

Figure 2:
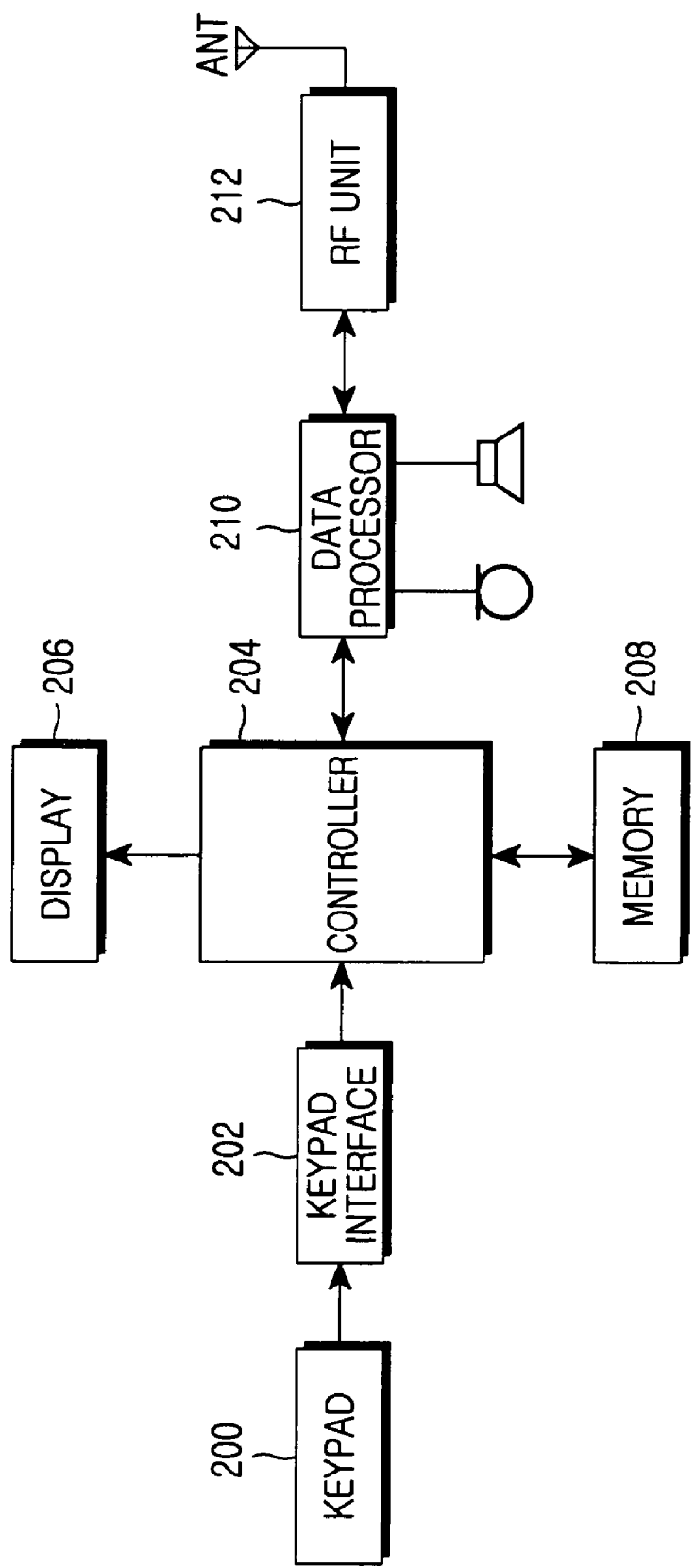
FIG. 2 is a block diagram illustrating a structure of a mobile terminal according to an embodiment of the present invention.

FIG. 2 is a block diagram illustrating a structure of a mobile terminal according to an embodiment of the present invention. A keypad 200, a device for interfacing with a user, comprises various function keys, a Send key, and a plurality of keys for inputting characters. A number, a character, and a special character mapped to each of the keys arranged on the keypad 200 are matched to a controller 204 via a keypad interface 202. The controller 204 controls the overall operation of the mobile terminal. According to an embodiment of the present invention, in an alphabet input mode, the controller 204 controls not only the function of inputting, by a user, a short message service (SMS) message, a phone number, a schedule, a memorandum, and the other information, but also a chatting function and a function of transmitting an e-mail, using the keypad 200. Further, the controller 204 has a function of outputting status information indicating arrival of an SMS message and a dialing state to a display 206. In addition, the controller 204 can display, on the display 206, the general operational state or status such as the current time, reception sensitivity, and a remaining battery life.

The display 206 visually displays various signals output from the controller 204, and can be implemented with a liquid crystal display (LCD). In this case, the display 206 can comprise a LCD controller, a memory for storing image data, and a LCD panel.

Figure 1:
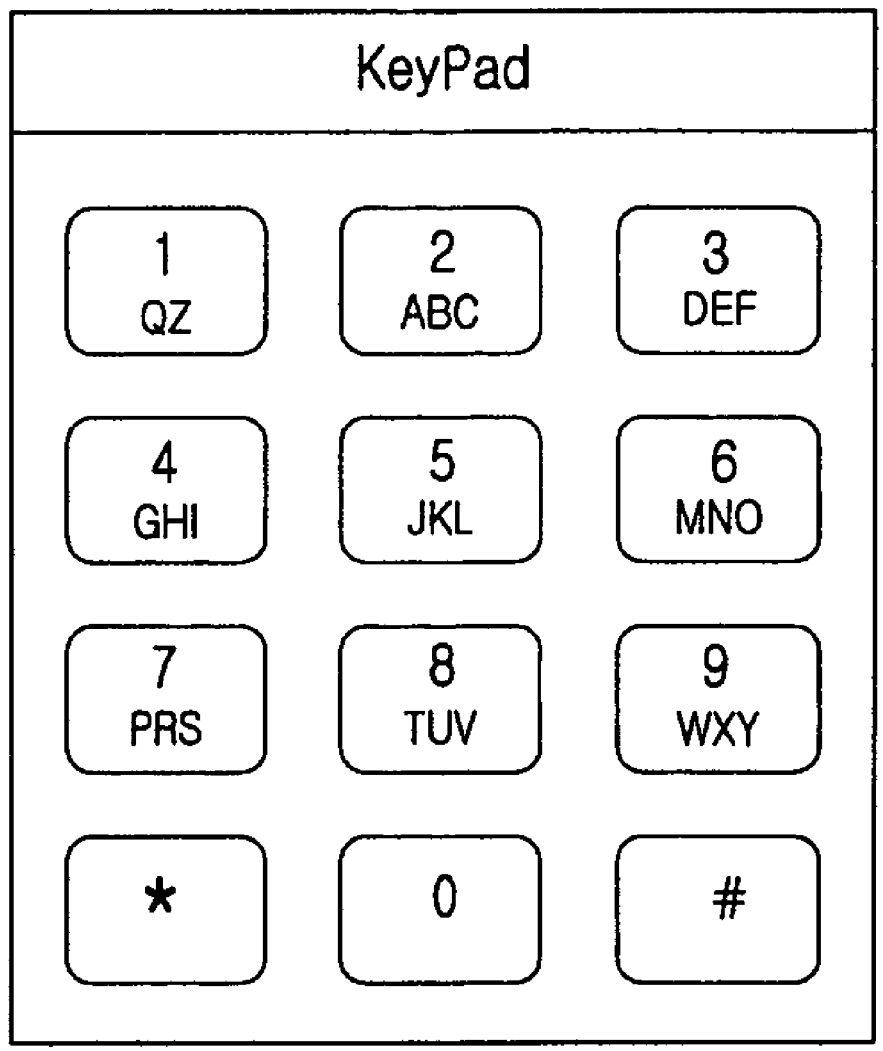
FIG. 1 is a diagram illustrating a layout of a conventional keypad for a mobile terminal.

A memory 208 can comprise a read only memory (ROM) and a random access memory (RAM). The memory 208 stores various temporal data generated in the processing process of the controller 204, and user data such as phone numbers, bell sounds, and image information. In addition, the memory 208 can store a program for controlling a general operation of the mobile terminal and a predetermined program for controlling signals generated by pressing a key on the keypad 200 by the user according to an embodiment of the present invention. Further, the memory 208 stores a priority table, in an embodiment of the present invention, for reducing the number of key presses in the process of inputting alphabet characters. The priority table refers to a table created by taking into account priority of a previously input alphabet, unlike the conventional way of displaying an alphabet corresponding to the number of keys presses for each of the keys on the keypad shown in FIG. 1. A detailed description of the priority table will be given later.

A data processor 210 comprises a receiver for demodulating and decoding received signals, and a transmitter for modulating and encoding transmission signals. That is, the data processor 210 can comprise a modem and a codec. The codec reproduces reception audio signals, output from a data codec for processing packet data and an audio codec for processing audio signals, or transmits transmission audio signals generated from a microphone to the audio codec of the data processor 210. In addition, the data processor 210 processes voice signals, received from the controller 204, for indicating information on another program in operation and the execution result.

A radio frequency (RF) unit 212 comprises a RF transmitter (not shown) for frequency-up-converting transmission signals and amplifying the frequency-up-converted transmission signals, and a RF receiver (not shown) for low-noise-amplifying received signals and frequency-down-converting the low-noise-amplified signals.

Figure 3A:
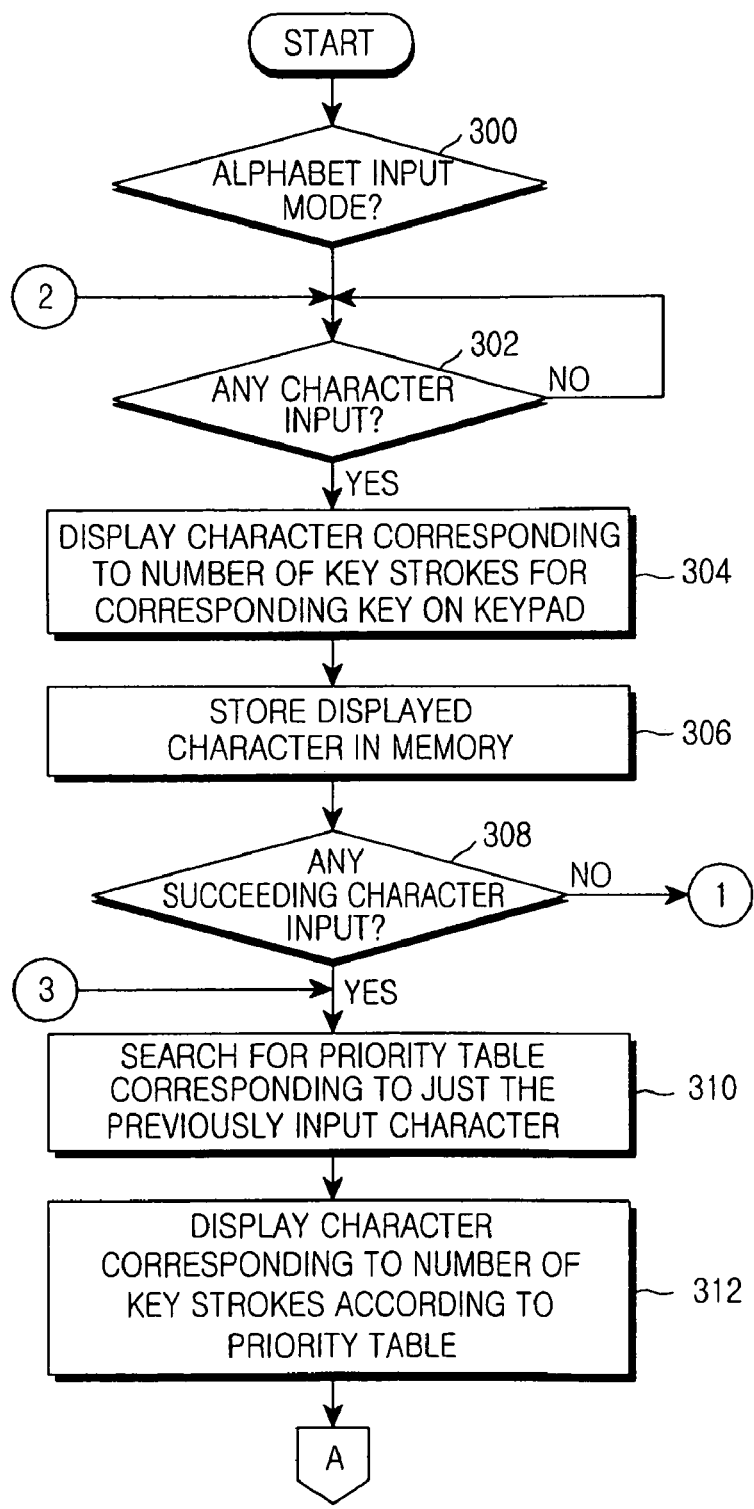
FIGS. 3A and 3B are flowcharts for a description of a method for displaying an alphabet character depending on a signal input through a keypad according to an embodiment of the present invention.
Figure 3B:
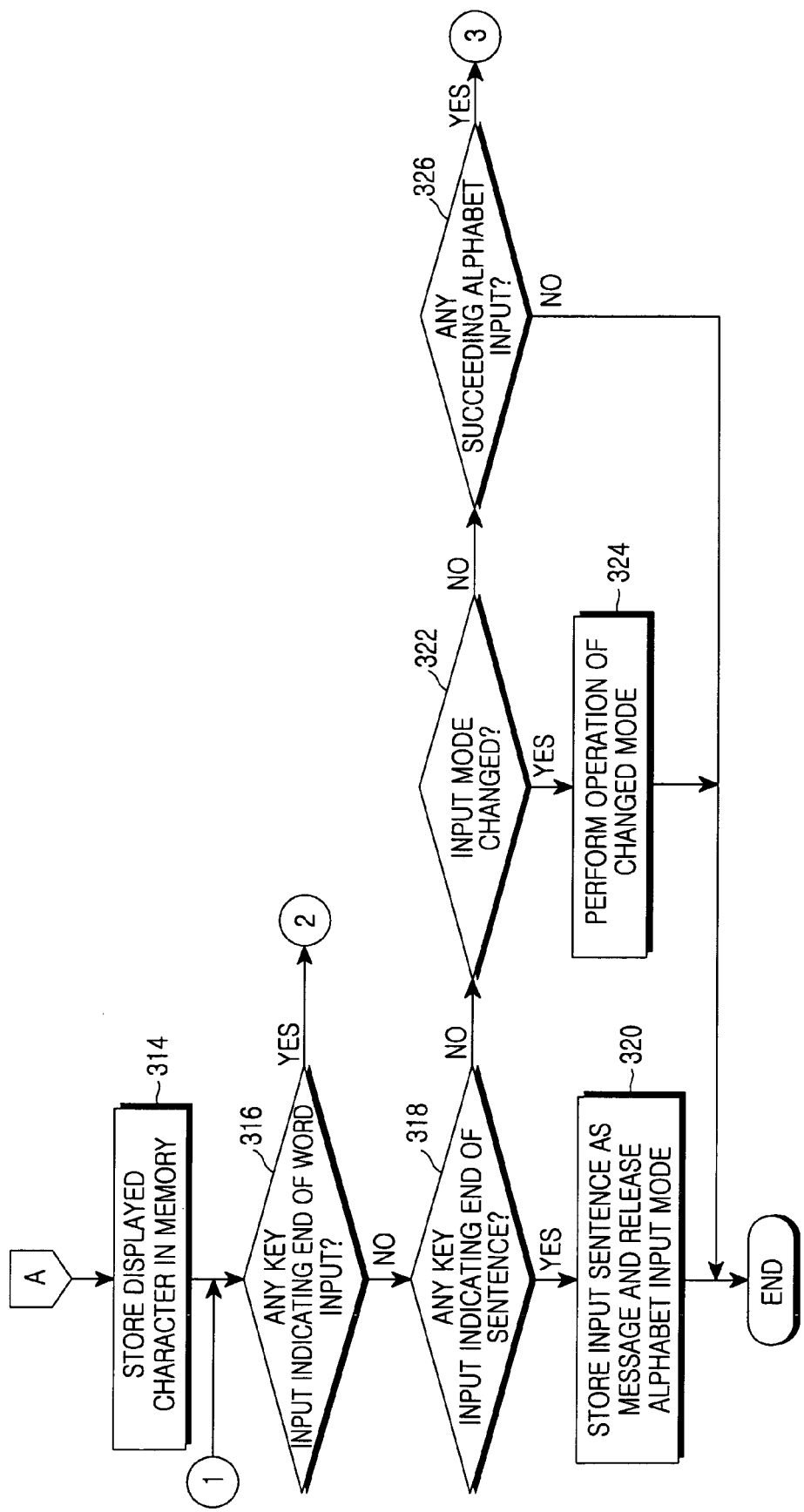

FIGS. 3A and 3B are flowcharts of a method for displaying an alphabet character depending on a signal input through a keypad according to an embodiment of the present invention. Referring to FIGS. 3A and 3B, in step 300, a controller 204 determines whether a current input mode is set to an alphabet input mode. The alphabet input mode refers to an input mode in which an alphabet input operation is needed to write a SMS message or store an address. If the current input mode is set to the alphabet input mode, the controller 204 proceeds to step 302 where it determines if a character has been input. If no character has been input, the controller 204 waits until an alphabet is input.

If it is determined in step 302 that a character has been input through a keypad 200, the controller 204 proceeds to step 304 where it displays on a display 206 a character corresponding to the number of key presses for a corresponding key on the keypad. In step 304, the controller 204 may comprise a process of determining whether the character first input in step 302 is an alphabet character. The controller 204 determines whether the first character is an alphabet character in order to process the step according to a user of the mobile terminal, or if a special character, such as *, ?, and !, is input. The controller 204 can either input the special character according to the user, or transition to a wait mode to re-receive an input, if the input special character is an incorrect input.

In step 304, if the first input is an alphabet character, the controller 204 displays an alphabet character corresponding to the number of key presses of a key on the keypad, and then proceeds to step 306 where it stores the alphabet in a memory 208. After storing the alphabet in the memory 208, the controller 204 determines in step 308 whether there is a succeeding alphabet input according to the key pressed on the keypad. If there is a succeeding alphabet character input, the controller 204 proceeds to step 310 where it searches the memory 208 for a priority table corresponding to a previously input alphabet character. However, if it is determined in step 308 that there is no succeeding alphabet character input, the controller 204 determines in step 316 whether there is a key input corresponding to an end of inputting a word. For example, the key corresponding to an end of inputting a word can be a space key corresponding to an end of inputting one word. For convenience, a previously input alphabet character will be referred to as a "first input character," and a succeeding input alphabet character will be referred to as a "second input character."

The controller 204 searches for a priority table corresponding to the first input character in step 310, and displays on the display 206 a character corresponding to the number of button presses for the corresponding button according to the priority table in step 312. The controller 204 stores the alphabet displayed on the display 206 in the memory 208 in step 314. After storing the alphabet, the controller 204 determines in step 316 whether any key input corresponds to an end of inputting a word. The key corresponding to an end of inputting a word can be a space key corresponding to an end of inputting one word.

If it is determined in step 316 that there is a key input corresponding to an end of inputting a word, the controller 204 returns to step 302 to determine whether there is any key input indicating an input of a new word.

If it is determined in step 316 that there is no key input corresponding to an end of inputting a word, the controller 204 determines in step 318 whether there is any key input corresponding to an end of inputting an English sentence. If there is a key input corresponding to an end of inputting an English sentence, the controller 204 proceeds to step 320 where it stores the input English sentence in the memory 208 as an SMS message and then releases the alphabet input mode. If it is determined in step 318 that there is no key input corresponding to an end of inputting an English sentence, the controller 204 determines in step 322 whether there is any key input corresponding to a change in the input mode. The key input corresponding to a change in the input mode comprises an input of a function key or a special key for performing a predetermined operation according to a corresponding key press, and an input of a setting key for inputting other characters.

If it is determined in step 322 that there is a key input corresponding to a change in the input mode, the controller 204 performs an operation of the changed mode according to the corresponding input mode in step 324. However, if there is no key input corresponding to a change in the input mode, the controller 204 determines in step 326 whether there is any succeeding alphabet input. If there is a succeeding alphabet input, the controller 204 returns to step 310 where it searches the memory 208 for a priority table corresponding to the first input character.

An embodiment of the present invention will now be described with reference to FIGS. 2, 3A and 3B. FIGS. 4A to 4C illustrate frequency of words in a table format, calculated for actual application of the present invention. Information regarding the frequency of words is stored in the memory 208 of FIG. 2. FIGS. 4A to 4C illustrate tables measured for 12000-word sentences related to a newspaper, article, journal, music, and novel having words with a high frequency of use. In FIGS. 4A to 4C, an alphabet in "<>" represents the first input character, and the number of 1 to 9 represents each of the number keys mounted on the keypad 200 included in the mobile terminal and represents a number key on the keypad 200, pressed to input the second input character.

More specifically, "<a>" indicates a first input character. An alphabet corresponds to a number of 1 to 9 and a number beside a colon represents priority of the alphabet based on frequency of occurrence of the corresponding alphabet with the first input character. The greater the number indicates the higher priority.

With reference to FIGS. 4A to 4C, a description will now be made of a comparison between the embodiment of the present invention and the conventional method of Table 1 in terms of the number of key strokes.

Conventionally, to input a sentence "I LOVE YOU" using Table 1, the user should press a key with a number '4' three times to input "I," a key with a number '5' three times to input "L," a key with a number '6' three times to input "O," a key with a number '8' three times to input "V, " a key with a number '3' two times to input "E," a key with a number '9' three times to input "Y," a key with a number '6' three times to input "O," and a key with a number '8' two times to input "U," amounting to a total of 22 key strokes.

However, in the embodiment of the present invention, referring to FIGS. 4A to 4C, the user presses the key with a number '4' three times to input "I," the key with a number '5' three times to input "L," the key with a number '6' once to input "O," the key with a number '8' three times to input "V," the key with a number '3' once to input "E," the key with a number '9' three times to input "Y," the key with a number '6' once to input "O," and the key with a number '8' once to input "U," amounting to a total of 14 key strokes, which is less than that of the conventional method by 8 strokes.

Table 2 illustrates a comparison between the proposed character input method and the conventional character input method for other sentences.

TABLE 2

| | Number of key strokes | |
|---|---|---|
| | Conventional Method | Inventive Method |
| I LOVE YOU | 22 | 14 |
| YOU MUST GO HOME | 27 | 18 |
| MICHAEL JACKSON | 30 | 16 |

It can be understood from Table 2 that the alphabet input method in accordance with an embodiment of the present invention is much less than the conventional alphabet input method in terms of the number of key strokes.

Although the embodiment of the present invention is applied herein to a mobile terminal with a keypad, it can also be applied to every device with a keypad.

As can be understood from the foregoing description, in the mobile terminal with a keypad, the alphabet input method in accordance with an embodiment of the present invention can decrease the number of key strokes compared with the conventional alphabet input method without a change in the structure of the keypad. In addition, compared with the device for displaying all of the words starting with characters input by the user based on an English dictionary, the device with a keypad can be implemented with the low memory capacity and the low power consumption in accordance with an embodiment of the present invention.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for inputting alphabet characters in a terminal with a numeric keypad comprising a plurality of keys, with ambiguous character entry, the method comprising:

receiving a first key input for a first input character in an alphabet input mode through the keypad;

searching for a priority table corresponding to the first input character;

receiving a second key input for a second input character in an alphabet input mode through the keypad;

upon receiving the second key input, determining a second input character by retrieving, as a selection of the second input character, an alphabet character from among the plurality of alphabet characters mapped to the second key in the priority table;

wherein receiving the second key input further comprises receiving at least one independent actuation of the second key for sequentially traversing a plurality of alphabet characters mapped to the second key, in a prioritized order, in the priority table from highest associated frequency of occurrence to lowest associated frequency of occurrence, of each of the plurality of alphabet characters mapped to the second key, wherein the priority table stores a prioritized mapping of the first input character to a plurality of alphabet characters, associated with a numeric key of the keypad, that can immediately succeed the first input character in a word, wherein the prioritized mapping is based on the associated frequency of occurrence of each alphabet character immediately succeeding the first input character in a word, wherein the first input character is unambiguous, wherein the second input character immediately succeeds the first input character, and wherein each key on the numeric keypad comprises a plurality of alphabet characters mapped to the key on the numeric keypad.

2. The method of claim 1, further comprising:

upon receiving the first or second key input, determining whether the first or second key input corresponds to an end of inputting a word; and determining whether there is a key input indicating an input of a new word, if there is a key input corresponding to an end of inputting a word.

3. The method of claim 2, further comprising:

determining whether there is a key input corresponding to an end of inputting a sentence; and storing the sentence as a message, if the key input corresponds to the end of inputting the sentence.

4. The method of claim 3, further comprising:

determining whether there is a key input corresponding to a change in input mode; and if there is a key input corresponding to a change in input mode, performing an operation of the changed input mode.

5. The method of claim 1, wherein the frequency of occurrence of a character is variable based on the position of the character in a word.

6. An apparatus for inputting an alphabet character in a terminal with a numeric keypad comprising a plurality of keys with ambiguous character entry, the apparatus comprising:

a memory for storing various alphabet characters input through the keypad and respective priority tables that correspond to the various alphabet characters, and storing in each of the priority tables, an occurrence frequency of at least two alphabet characters mapped, in the priority table, to a second key input immediately succeeding a corresponding first input character; and a controller for searching for a priority table whenever the key is stroked for a first input character, receiving a second input character by sequentially traversing a plurality of alphabet characters mapped to the second key, retrieved from the priority table in a prioritized order from higher associated frequency to lower associated frequency, and determining, as the second input character, a character from among the retrieved characters mapped to the second key, wherein the priority table has at least one association of a succeeding alphabet character with a position of the succeeding alphabet character in a word based on the succeeding alphabet character's frequency of occurrence succeeding the first input character.

7. The apparatus of claim 6, wherein the controller determines whether there is a key input corresponding to an end of inputting a word, and outputs a next input alphabet character to the display according to the number of key presses of a key input on the keypad if there is a key input corresponding to an end of inputting a word.

8. The apparatus of claim 6, wherein the frequency of occurence of a character occurring is variable based on the position of the character in a word.

9. The apparatus of claim 6, wherein the controller determines whether there is any key input corresponding to an end of inputting a sentence, and stores the sentence as a message, if the key input corresponds to the end of inputting the sentence.

10. The method of claim 1, further comprising:

displaying the first input character; and upon receiving actuation of the second key for the second key input, displaying each of the alphabet characters mapped to the second key by sequentially traversing each of the plurality of alphabet characters mapped to the second key, in a prioritized order in the priority table from highest associated frequency of occurrence to lowest associated frequency of occurrence.

* * * * *